March 7, 1933.  P. F. YUNGLING  1,900,268
VALVE MECHANISM
Filed June 13, 1928  2 Sheets-Sheet 1
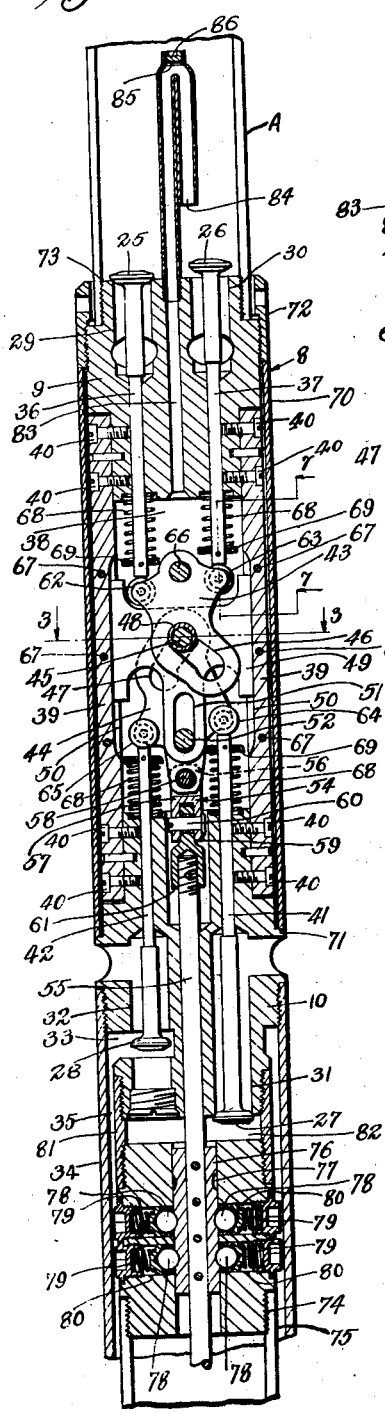
Fig. 1.
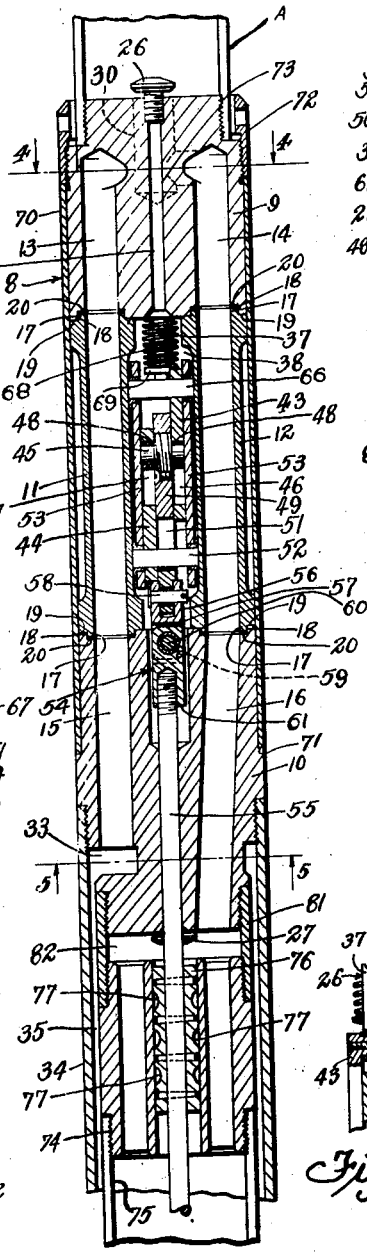
Fig. 2.
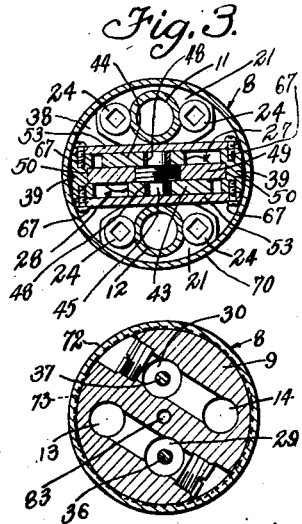
Fig. 3.
Fig. 4.
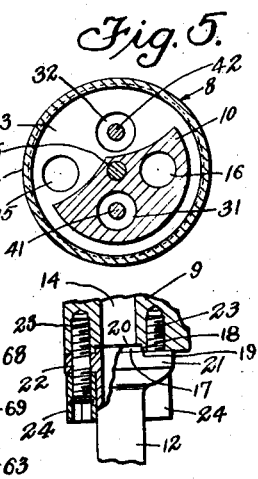
Fig. 5.
Fig. 6.
Fig. 7.
Inventor
Paul F. Yungling
By Lyon & Lyon
Attorneys

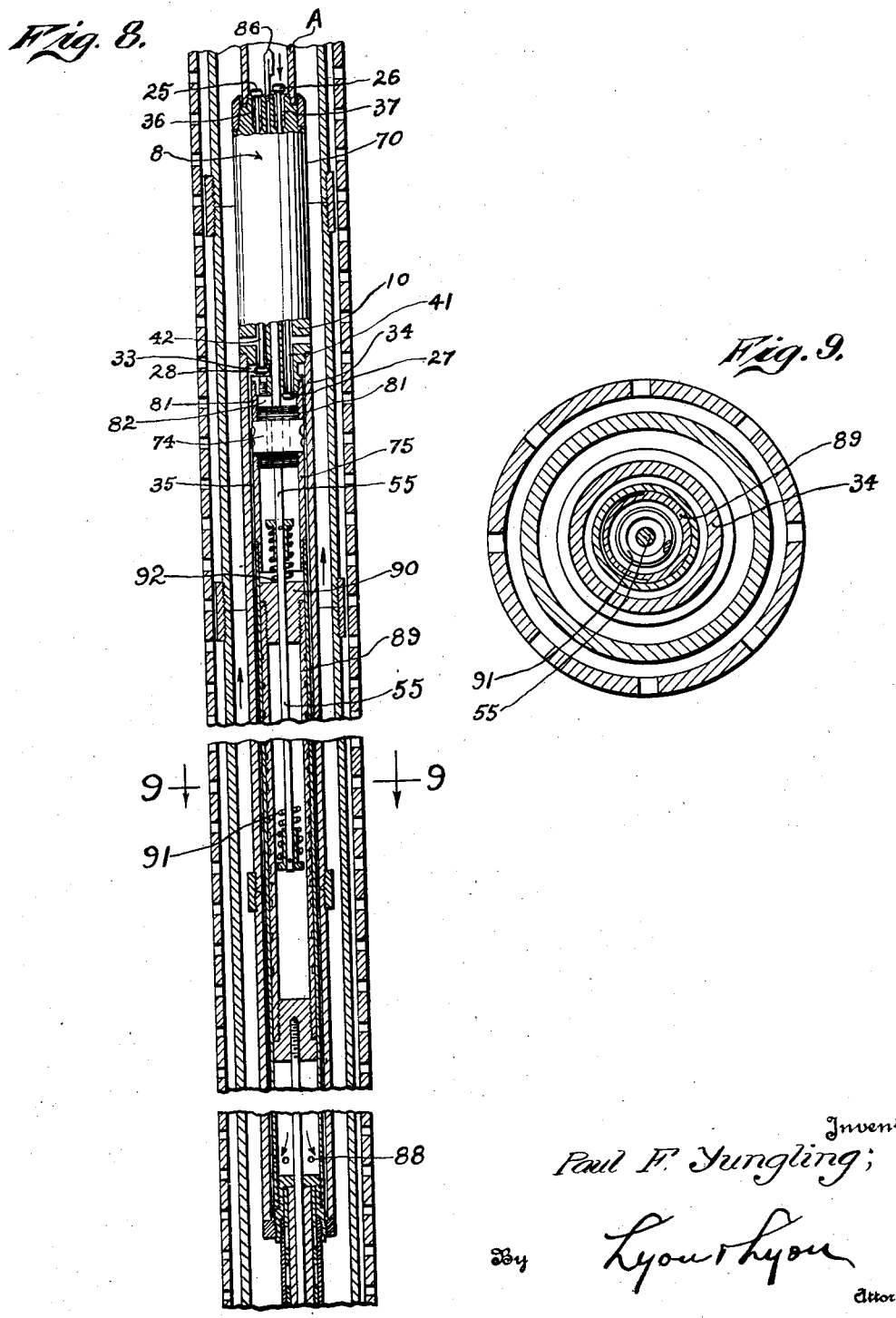

Patented Mar. 7, 1933

1,900,268

UNITED STATES PATENT OFFICE

PAUL F. YUNGLING, OF LOS ANGELES, CALIFORNIA, ASSIGNOR TO SCOTT-ROSS AND COMPANY, OF LOS ANGELES, CALIFORNIA, A CORPORATION OF DELAWARE

VALVE MECHANISM

Application filed June 13, 1928. Serial No. 285,025.

This invention relates to valve mechanism and is an improvement on the valve mechanism disclosed in my copending application filed October 15, 1927, Serial No. 226,412. This type of valve mechanism may be employed in connection with fluid operated deep well pumps, slush or mud pumps, and other types of pumps, and, in fact, wherever a valve of this type would be serviceable. The design and proportions of the different parts may be altered to suit the various conditions that may be present. The design and proportions of the valve mechanism illustrated are suitable, for example, for use with a deep well pump of the type disclosed in my copending application filed March 20, 1928, Serial No. 263,105, as it can be substituted for the valve mechanism disclosed in said application.

One of the most important objects of this invention is to provide larger areas for the fluid passages and, at the same time, keep the diameter of the valve mechanism small so that it can be used in very deep oil wells which, ordinarily, are of comparatively small diameter in their lower portions where the pump is situated.

Another important object is to provide a smooth working valve mechanism.

Another object is to reduce the number of moving parts, thus reducing the amount of friction.

Another object is to make provision for preventing, or minimizing, inflow of operating fluid to the lubricant in which the parts that are subjected to friction are immersed, thus making it possible to maintain the lubricant in a clean condition and uncontaminated by dirty oil.

Other objects and advantages will appear in the subjoined detailed description.

The accompanying drawings illustrate the invention.

Fig. 1 is a longitudinal mid-section of a valve mechanism constructed in accordance with the provisions of this invention, fragments of tubing being indicated in broken lines connected with said mechanism.

Fig. 2 is a longitudinal section taken on a plane at substantially 90° from the plane of section of Fig. 1.

Fig. 3 is a horizontal section on the line indicated by 3—3, Fig. 1.

Figs. 4 and 5 are horizontal sections on the lines indicated by 4—4, 5—5, respectively, Fig. 2.

Fig. 6 is a fragmental sectional detail of the connection between one of the heads and one of the tubular sections.

Fig. 7 is a fragmental sectional detail on the line indicated by 7—7, Fig. 1.

Figure 8 is a view, mainly in vertical section, of a portion of a deep well pump of which the valve mechanism of this invention constitutes a part.

Figure 9 is an enlarged horizontal section on the line indicated by 9—9, Figure 8.

The body of the valve mechanism is indicated in general by the character 8 and comprises a number of sections, an upper section, or head, 9, a lower section, or head, 10, and tubular intermediate sections 11, 12, which connect passages 13, 14 in the head 9 with passages 15, 16, respectively, in the head 10. To secure the members 11, 12 to the heads, the ends of the sections 11, 12 are provided with ends 17 that telescope into recesses 18 formed in the heads 9, 10, there being shoulders 19 on the sections 11, 12 outside of the ends 17 for the heads 9, 10 to seat against. Copper gaskets 20 are placed in the recesses 18 between the ends 17 and the heads. Near their ends, the sections 11, 12, are provided with flanges 21 in which are holes 22 to receive studs 23 that project from the heads, nuts 24 on said studs seating against the flanges 21 to hold said flanges securely to the heads.

The valves are indicated at 25, 26, 27, 28, and control ports 29, 30, 31, 32 respectively. The port 29 communicates with the passage 13 and the port 30 opens to the upper end of the head 9 and communicates with the passage 14. The port 31 opens to the lower end of the head 10 and also to the periphery of said head. The port 32 opens to the periphery of the head 10 and communicates with the chamber 33 in which the head of the valve 28 is positioned. Connected with the head 10 is a tubular member 34, which affords an annular passage 35 communicating with the chamber 33. This passage 35 is intended to connect with one end of the cylinder of the pump with which the valve mechanism is to function.

The sections 11, 12 are spaced, and in the space thus formed is mounted the mechanism that operates the stems of the valves. The stems 36, 37 of the valves 25, 26 project downwardly through the head 9 into a chamber 38 which is formed between the heads 9, 10 and cover plates 39 secured by screws 40 to the heads 9, 10. The stems 41, 42 of the valves 27, 28 project upwardly through the head 10 and into the chamber 38. The tubular sections 11, 12 are also positioned in the chamber 38.

In the space between the sections 11, 12 are mounted cams 43, 44, which are caused to rock by a pin 45 that projects through cam slots 46, 47 in the cams 43, 44, respectively. The pin 45, in this instance, carries rollers 48 so as to minimize friction, the bearing of the cams being on said rollers.

The rollers are on the end portions of the pin 45 and the middle portion of said pin is screwed into a slide 49 that moves in guide grooves 50 formed in the inner faces of the cover plates 39. The slide 49 is provided at one end axially thereof with a longitudinally extending slot 51, through which extends a pin 52, whose ends are secured in cover plates 53. The pin 52 and slot 51 constitute a lost motion connection between the slide 49 and a universal joint 54, which serves to connect the lost motion connection with an actuating rod 55 that passes axially through the head 10, being shiftably mounted in said head. The universal connection 54 comprises a fork 56 formed on the upper end of a link 57, a pin 58 connecting the fork 56 and slide 49, a fork 59 formed on the lower end of the link 57, and a pin 60 connecting the fork 59 with a socket member 61 into which the rod 55 is screwed.

The cam 43 includes a pair of rollers 62, 63 which bear against the lower ends of the valve stems 36, 37, and the cam 44 includes rollers 64, 65 that bear against the upper ends of the valve stems 41, 42. The cam slots 46, 47 are arranged at an angle with reference to the longitudinal axes of the cams so that rocking of the cams is produced when the slide 49 is moved longitudinally by actuation of the rod 55.

The cam 43 rocks on a pivot 66, the ends of which are seated in the cover plates 53, and the cam 44 rocks on the pin 52. The cover plates 53 are secured by screws 67 to the cover plates 39, and all of said cover plates constitute portions of the body 8.

The valves are retracted by coil springs 68, which always tend to hold the valve stems engaged with the several rollers which actuate them. The springs 68 surround the valve stems, seating at one end against the heads 9, 10, as the case may be, and against spring seats, or abutments, 69 secured to the valve stems.

Surrounding the adjacent ends of the heads 9, 10, and closely fitting said heads, is a tubular casing 70, the lower end of said casing seating against an annular shoulder 71 on the head 10, and the upper end of said casing being engaged by the lower end of a nut 72, which is screwed on to the head 9. This nut 72 secures the casing 70 in place.

The upper end of the head 9 is screw-threaded at 73 so that the tubing A, carrying the power fluid, can be screwed on to said head. The lower head is screw-threaded at 74 so that tubing 75 can be screwed thereon, the outside diameter of the tubing 75 being less than the inside diameter of the tubing 34 so as to produce the annular passage 35 for the operating fluid, as will be made clear hereinafter. The tubing 75 may constitute the cylinder of a fluid-actuated motor of which the piston is indicated at 89 in Figure 8.

As stated above, the tubing 34 connects with one end of the cylinder of the pump which is to be operated by the power fluid, and the tubing 75 will connect with the other end of said cylinder. The cylinder 75 communicates with the space 35 through a port or ports 88 in the lower end of said cylinder.

The operating rod 55 will be connected with the piston 89 that operates the pump, and a means is provided to releasably hold the rod 55 in two different positions against longitudinal movement. For this purpose, the rod 55 is provided with an enlargement 76 containing in its periphery a series of notches 77 adapted to be engaged by detents 78 positioned at opposite sides of the rod. The detents on each side will be one less than the number of notches on each side and, though the detents and notches may be provided only on one side, I have shown them on both sides. The detents 78 are yieldingly held in some of the notches by coil springs 79 mounted in spring chambers 80 formed in the head 10. In this particular instance, the head 10 is constituted by two sections joined by a coupling 81 and the two head sections are spaced to form a chamber 82 into which the valve 27 projects. The combined pressures of the spring 79 will be such that the force, tending to move the rod 55, will reach a predetermined value before the rod 55 is released from the detents.

Any suitable fluid may be used as the operating medium with the above described valve mechanism, for example, oil under pressure, said pressure being secured by a suitable pump which, in the event of the valve mechanism working in a well, will be positioned at the surface and will supply the operating fluid through the tubular member A.

The provision of the chamber 38 affords opportunity to immerse the friction parts of the mechanism in a lubricant and if a liquid is employed for the power fluid, it is desirable that said power fluid be maintained separate from the lubricant. If, for example, oil is to be used as the power fluid, said oil may be, or may become, charged with foreign particles that it is desirable to exclude from the lubricant in the chamber 38. While this may be approximately attained without the use of any special device, it will be readily understood that because of movement of the rod 55 in-and-out of the chamber 38, a breather duct must be provided which will communicate the chamber 38 with the interior of the tubing A. The breather duct is indicated at 83 extending from end to end of the head 9. If the upper end of the breather duct 83 opened directly upwardly into the tubing A, it will be readily seen that as the lubricant surges up and down in the duct 83, the power oil in contact with said lubricant might, in the course of time, become mixed therewith, and the heavier particles, at least, and, more especially foreign particles, might gravitate downwardly and finally enter the chamber 38. To avoid this, I preferably extend the duct 83 upwardly above the upper end of the head 9, thence downwardly so that the outer end of said duct opens downwardly as indicated at 84, thus making it practically impossible for foreign particles to enter the duct and, in fact, tending to prevent mixing of the lubricant with the power oil.

At the highest point in the duct 83 is a filling opening 85 normally closed by a plug 86. After the valve mechanism is assembled, the lubricant will be supplied through the opening 85 up to the level where the duct turns downwardly, and the plug 86 will then be screwed in the said opening. The filling will be effected when the rod 55 is at the lower end of its stroke and, thus, when the power fluid is in the tubing A it will ascend to meet the level of the lubricant. When the rod 55 moves upwardly, the lubricant in the duct 83 will be forced down the duct toward the open end 84, and, hence, power oil will surge up and down in the short leg of the duct and not tend to mix with the lubricant.

The valve mechanism described above operates as follows:

It will be assumed that the power fluid is supplied to the tubing A under pressure by a pump, that the valves 25, 27 are closed, and valves 26, 28 open, as in Fig. 1. Since the rod 55 is at the upper end of its stroke, the piston is at the upper end of its stroke.

The power fluid passes from the tubular member A, through the port 30 into the passage 14, thence through the tubular section 12, passage 16, to the upper end of the cylinder 75 to actuate the piston on its down stroke. The power fluid beneath the piston will be forced upwardly through the tubing 34, thence through the chamber 33 and port 32 to the exterior of the valve mechanism.

The connection between the rod 55 and the piston will preferably be such that there will be a certain amount of lost motion between the rod and the piston on both strokes of the piston. The lost motion device, in this instance, is constructed as follows: the rod 55 projects through the upper head 90 of the cylinder and is provided below said head with a lower shoulder 91 and above said slot with an upper shoulder 92, said shoulders, in this instance, being in the form of coil springs 93 surrounding and connected with the rod 55. The shoulder 92 engages the outer end of the head 90 on the up-stroke of the piston, and the shoulder 91 engages the inner end of said head on the down-stroke of the piston. It will be seen that the up-stroke of the piston compresses the upper spring 93, thus storing power in said spring which, after such further movement upward of the piston as required to unseat the detents 78, then expands to move the rod 55 a sufficient distance to permit the detents to again seat. Likewise, the down-stroke of the piston compresses the lower spring so that it subsequently functions to move the rod 55 a sufficient distance to permit seating of the detents 78. Assuming, then, that the piston has descended sufficiently far to pull the rod 55 downwardly, thus releasing it from the detents 78, said detents will again engage in certain of the notches 77 and hold the rod in its lower position. Downward movement of the rod 55 rocks the cams 43, 44, thus reversing the positions of the valves, opening the valves 25, 27 and closing the valves 26, 28. The power fluid now passes from the tubing A through the port 29, thence through the passage 13, tubular section 11, and the passage 15, into the tubing 34, thence to the lower end of the cylinder so as to actuate the piston on its up stroke. The power fluid previously forced into the upper end of the cylinder will now be forced by the piston upwardly past the valve 27, through the port 31, to the exterior of the valve mechanism.

It will be readily seen that if the valve mechanism were placed inside of pump tubing through which oil was being pumped, the power fluid exhausting, as mentioned above, from the ports 31, 32 would pass into the pump tubing and ascend with the column of oil being pumped from the well. However, as explained above, the valve mechanism may be used elsewhere than in well-pumping apparatus.

I claim:

1. A valve mechanism comprising a body provided with ports, valves to control the ports and provided with stems, cams pivotally mounted in the body, one of the cams operably connected with two of the valve stems and the other cam operably connected with two other of the valve stems, a slide shiftably mounted in the body and operably connected with the cams to rock said cams, and a rod slidably mounted in the body and connected with the slide.

2. A valve mechanism comprising a body provided with ports, valves to control the ports and provided with stems, cams pivotally mounted in the body, one of the cams operably connected with two of the valve stems and the other cam operably connected with two other of the valve stems, a rod slidably mounted in the body, a means operably connecting the rod and cams, and a means between the rod and body to yieldingly hold the rod in different positions.

3. A valve mechanism comprising a body provided with ports, valves to control the ports and provided with stems, cams pivotally mounted in the body, one of the cams operably connected with two of the valve stems and the other cam operably connected with two other of the valve stems, a slide shiftably mounted in the body and operably connected with the cams to rock said cams, a rod slidably mounted in the body and connected with the slide, and a means between the rod and body to yieldingly hold the rod in different positions.

4. A valve mechanism comprising a body provided with ports, valves to control the ports provided with stems, cams pivotally mounted in the body, one of the cams operably connected with two of the valve stems and the other cams operably connected with two other of the valve stems, the cams provided with cam slots arranged at an angle relative to the longitudinal axes of the cams, a slide shiftably mounted in the body, a pin carried by the slide and extending through the cam slots, and a means to actuate the slide.

5. A valve mechanism comprising spaced heads provided with ports, valves to control the ports provided with stems projecting into the space between the heads, a means in said space to actuate the stems, the heads provided with passages, the passages in one of the heads communicating with the ports thereof, recesses in the heads at ends of the passages, tubular sections positioned with their ends in the respective recesses, a shoulder on one of the heads, a nut threaded on the other head, a casing between the nut and the shoulder, and means detachably securing the tubular sections to the heads.

6. A valve mechanism comprising spaced heads provided with non-communicating ports, valves to control the ports provided with stems projecting into the space between the heads, a means in said space to actuate the stems, the heads provided with passages, the passages in one of the heads communicating with the ports thereof, and tubular sections in the space on opposite sides of the actuating means for communicating the passages in one head with the passages in the other head.

7. A valve mechanism comprising spaced heads provided with non-communicating ports, valves to control the ports provided with stems projecting into the space between the heads, a means in said space to actuate the stems, the heads provided with passages, the passages in one of the heads communicating with the ports thereof, tubular sections in the space detachably engaging the heads and communicating the passages in one head with the passages in the other head, means enclosing the space, and means to detachably secure the last mentioned means to the heads.

8. A valve mechanism for an in-the-well pump, comprising a body attachable at its upper end to well tubing containing a supply of fluid under pressure, said body being provided with ports and with a closed chamber filled with a lubricating liquid and with a duct communicating at its lower end with the chamber, said duct projecting upwardly from the body, thence downwardly, and the outer end of the duct opening downwardly into the liquid in said well tubing, valves to control said ports, means mounted in the body and extending into the chamber to operate said valves, and means in the chamber forming passages extending through said chamber, the body provided with passages communicating with opposite ends of the first mentioned passages, two of the second mentioned passages communicating with two of the ports, and two other of the ports and second mentioned passages opening to the exterior of the body.

Signed at Los Angeles, Calif., this 2nd day of June 1928.

PAUL F. YUNGLING.